(12) United States Patent
Shin (10) Patent No.: US 6,529,458 B1
(45) Date of Patent: Mar. 4, 2003

(54) METHOD FOR MANAGING DEFECTIVE AREA OF OPTICAL RECORDING MEDIUM

(75) Inventor: Jong In Shin, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/404,303

(22) Filed: Sep. 24, 1999

(30) Foreign Application Priority Data

Sep. 26, 1998 (KR) ............................................. 98-40144

(51) Int. Cl.$^7$ ................................................ G11B 7/00
(52) U.S. Cl. .................................................. 369/53.17
(58) Field of Search .......................... 369/53.12, 53.15, 369/53.17

(56) References Cited

U.S. PATENT DOCUMENTS

| | | | | |
|---|---|---|---|---|
| 5,737,290 | A | * | 4/1998 | Ohmori ........................ 369/58 |
| 5,966,358 | A | * | 10/1999 | Mine ........................... 369/58 |
| 6,049,515 | A | * | 4/2000 | Yamamuro ...................... 369/48 |
| 6,052,346 | A | * | 4/2000 | Arataki et al. ................. 369/32 |
| 6,205,099 | B1 | * | 3/2001 | Sasaki et al. .................. 369/54 |

* cited by examiner

*Primary Examiner*—Nabil Hindi
(74) *Attorney, Agent, or Firm*—Birch, Stewart, Kolasch & Birch, LLP (57) ABSTRACT

A technology for managing a defective area of a rewritable optical recording medium is disclosed. This technology (1) returns information on a defective area to a host when the defective area is first encountered, (2) writes the data intended for the defective area to another area within the user area (also known as the data area) under the control of the control unit, (3) writes positional information about the defective area on a particular position in the data area, and (4) corrects information in the ICB with reference to the positional information about the defective area. This prevents the reduction of recording capacity otherwise caused by the use of spare areas and improves an efficiency of use of the disk in a rewritable optical recording medium. This is achieved by replacing a defective block with another block within the data area only when a defect is encountered and making a file system to manage the defective areas. This technology protects data with an effect identical to a linear replacement technique, and yet the recording capacity can be increased. Also, this technology prolongs a life time of the disk, because there is no limitation on a size of the available replacement block, permitting data writing to continue regardless of a number of defective sectors.

22 Claims, 8 Drawing Sheets

|  | starting sector address | number of sectors |
|---|---|---|
| file 1 | A | N |

FIG.8B

|  | starting sector address | number of sector |
|---|---|---|
| file 1 | A | N1 |
|  | C | L |
|  | F | N2 |

FIG.9

METHOD FOR MANAGING DEFECTIVE AREA OF OPTICAL RECORDING MEDIUM

BACKGROUND OF THE INVENTION

1. Field of the Invention

The present invention relates to a rewritable optical recording medium system, and more particularly, to the associated method for managing a defective area on an optical recording medium.

2. Background of the Invention

In general, in the optical recording media, there are a ROM type for read only, a WORM type for writing once, and a rewritable type for repetitive writing. In the ROM type optical recording media, there are CD-ROM (Compact Disc Read Only Memory), DVD-ROM (Digital Versatile Disc Read Only Memory) and the like, and, in the WORM type optical recording medium, there are CD-R (Recordable Compact Disc) which permits one time writing, DVD-R (Recordable Digital Versatile Disc) which permits one time writing, and the like. And, in disks which are rewritable freely and repetitively, there are CD-RW (Rewritable Compact Disc), and rewritable digital versatile disc (DVD-RAM, DVD-RW).

In rewritable optical disks, information writing/reading thereto/therefrom is done repetitively. The repetitive write/read of information causes a change in a ratio of components, i.e., the mixture, that form a recording layer (provided for recording information), from an initial mixing ratio. This leads to a loss in the initial properties of the mixture, and that causes errors to occur in writing/reading information. This overall process is called degradation.

Areas of degradation are identified as defective areas when formatting, or when executing a write or read command for the optical disk. Other than by degradation, defective areas of the rewritable optical disk are caused by scratch on a surface, dust particles, and/or from production defects. To prevent writing/reading data to/from the defective areas formed by the foregoing causes, management of the defective areas is required.

Figure 1:
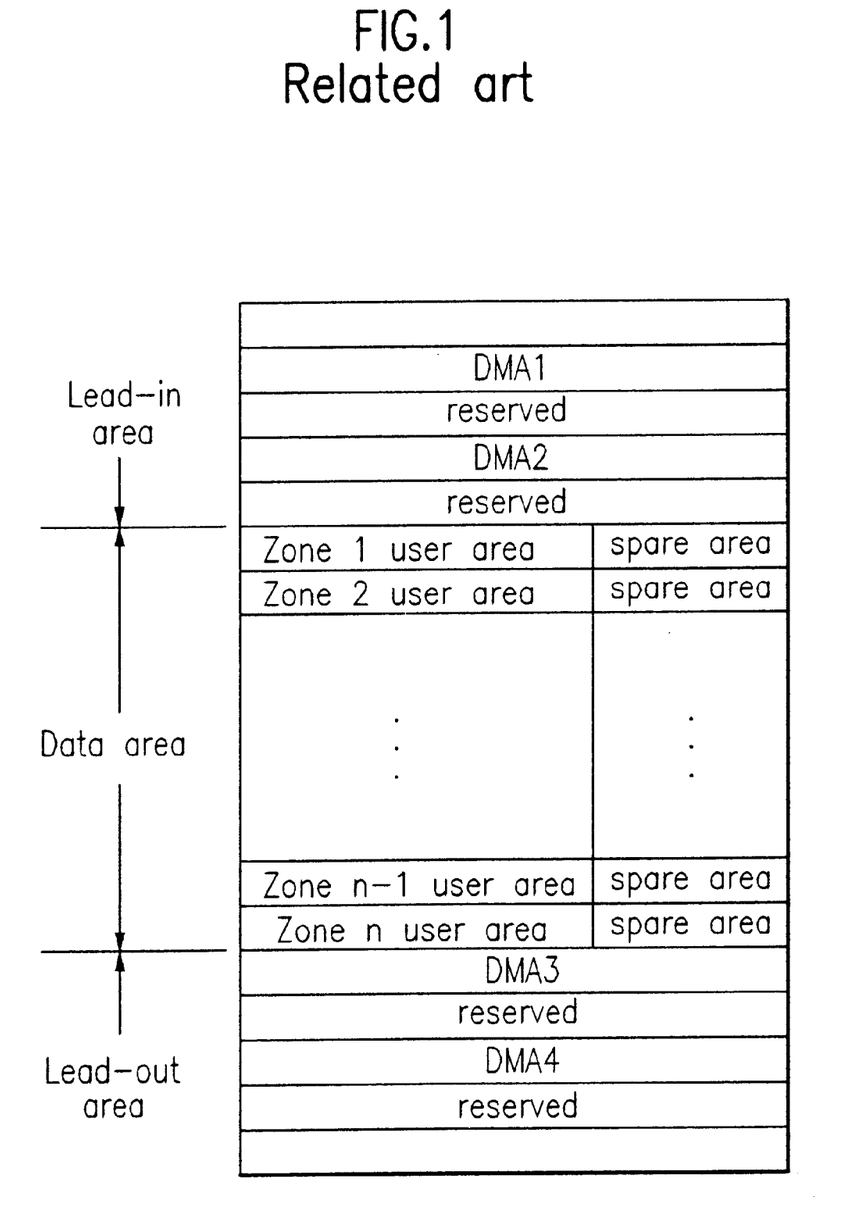
FIG. 1 illustrates a structure of a related art optical disk.

As shown in FIG. 1, DMA's (Defect Management Areas) are provided in a lead-in area and in a lead-out area of the optical recording medium for managing the defective areas of the optical recording medium. Data areas are managed in zones (or groups), each having a user area for use in actual writing of data and a spare area to prove replacement capacity in the case of defects in the user area. In general, there are four DMAs provided in one disk (for example, a DVD-RAM), two in the lead-in area and the other two in the lead-out area.

As management of the DMAs is important, the same data is repeatedly written in the four DMAs for its protection. Each DMA has two blocks having 32 sectors in total, i.e., one block has 16 sectors. Each DMA has a PDL (Primary Defect List) which is a primary data storage and an SDL (Secondary Defect List) which is secondary data storage. In general, the PDL contains entries of defects that occurred during fabrication of the disk, and all defective sectors identified during formatting, i.e., initializing and re-initializing, of the disk. On the other hand, the SDL, which is organized in block units, contains entries of defective areas that occurred after the formatting, or defective areas that cannot be listed on the PDL during the formatting. The defective areas (i.e., defective sectors or defective blocks) in the data area are replaced with good areas, according to a slipping replacement algorithm or linear replacement algorithm.

Figure 2A:
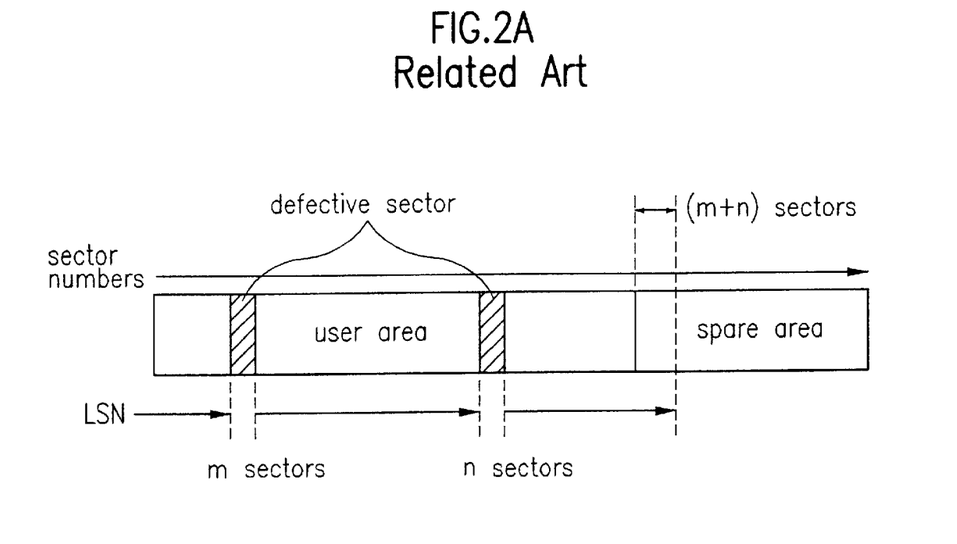
FIG. 2A illustrates a general slipping replacement method according to the related art.

FIG. 2A depicts a circumstance in which the slipping replacement algorithm is applied to a defective area listed on the PDL. If the defective sector is present in the user area on which actual data is to be written, then the defective sector is skipped. The defective sector is replaced with a good sector next to the defective sector.

Figure 2B:
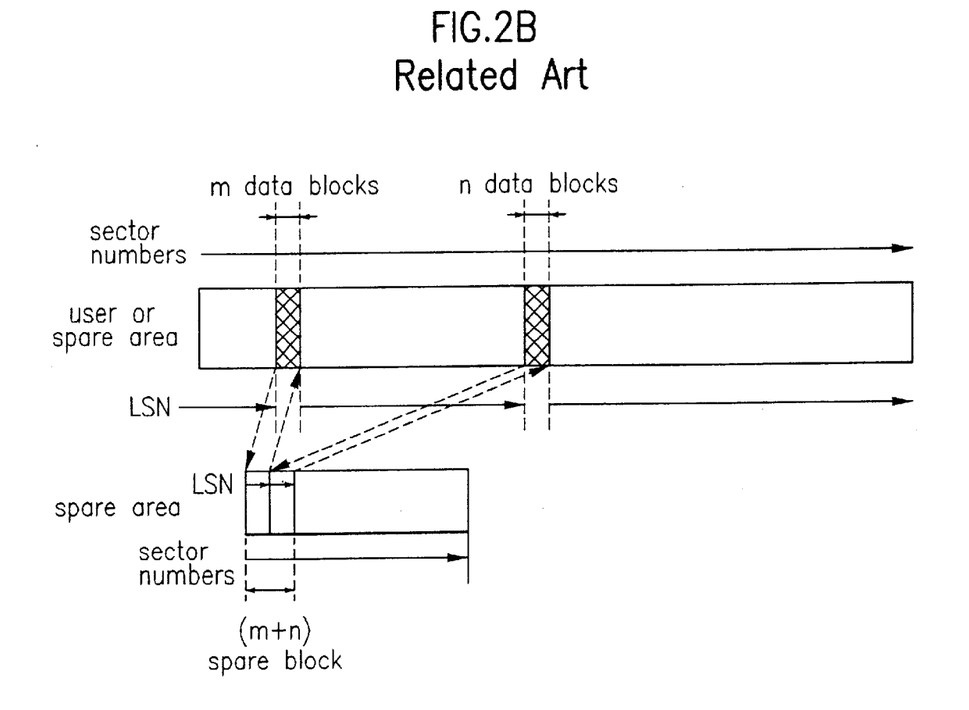
FIG. 2B illustrates a general linear replacement method according to the related art.

FIG. 2B depicts a circumstance in which the linear replacement algorithm is applied to a defective area listed on the SDL. If the defective block is present in the user area or the spare area, then the defective block is replaced with block units of replacement areas assigned to the spare area.

Figure 3:
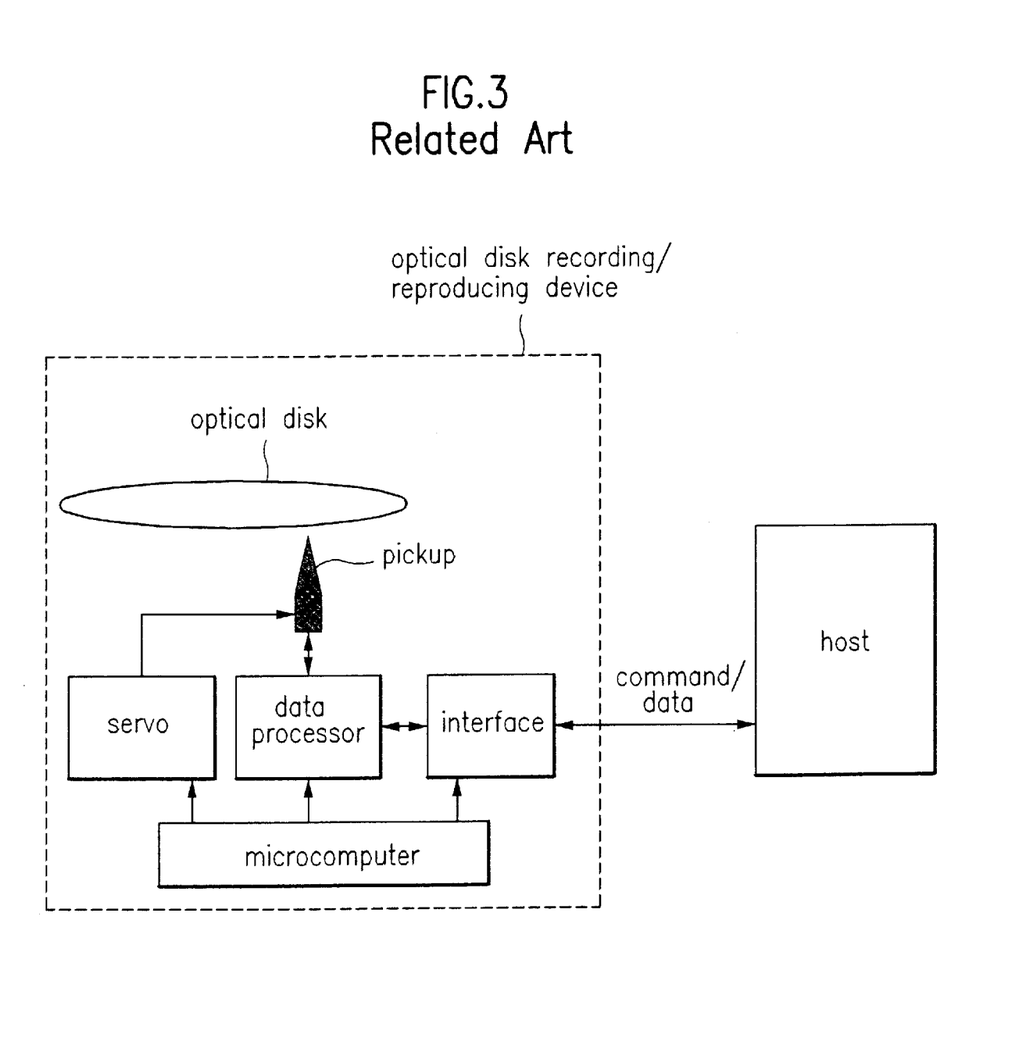
FIG. 3 illustrates a block diagram of a general optical disk recording/reproducing device according to the related art.

FIG. 3 illustrates a block diagram showing one example of a recording portion of a related art optical recording medium recording/reproduction device. It is provided with an optical pickup for writing/reading data to/from an optical recording medium, a pickup servo unit for controlling the optical pickup to maintain a distance between an objective lens in the optical pickup and the optical disk and for tracking a pertinent track, a data processor for processing and providing an input data to the optical pickup, an interface for exchanging data with an external host, and a microcomputer for controlling the above units. A host is connected to the interface of the device for recording/reproducing data to/from an optical recording medium for exchange of command and data.

Figure 4:
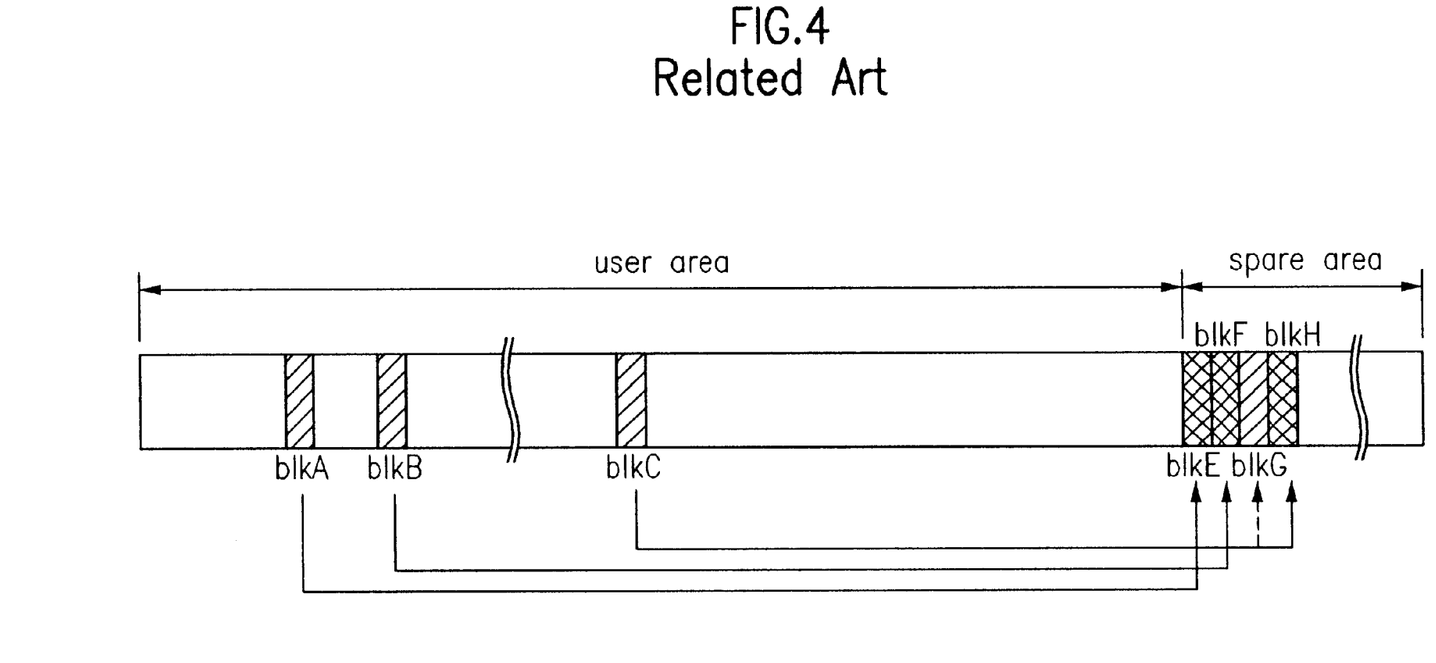
FIG. 4 illustrates data writing on a general optical disk using a linear replacement of SDL according to the related art.

Referring to FIG. 4, when data to be written is provided to the host, the host then provides the data to be written together with a write command to the device for recording/reproducing data to/from an optical recording medium. In this instance, the device for recording/reproducing data to/from an optical recording medium writes no data on defective areas utilizing the PDL and the SDL. That is, physical sectors listed on the PDL are skipped in the writing. As shown in FIG. 4, physical blocks blkA and blkB (listed on the SDL) are replaced with replacement blocks blkE and blkassigned to the spare area in the writing. If a defect occurs again in a replacement block blkG (that was intended to replace the defective block blkC), a new replacement block blkH in the spare area is assigned to the defective block blkC for writing the data. And, during a writing or reading operation, if a defective block is discovered that is also not listed on the SDL, then a replacement block is located in the spare area, the data on the defective block is written thereon again, and positional information on the defective block are listed on the SDL entry for protection of the data. Instead of a defective block, if a block having a high possibility of causing an error is discovered during a writing or reading operation, then this block is treated as if it were a defective block in the manner just described. Thus, not only blocks with defects, but also blocks with a high possibility of causing errors, for example, blocks error thereon can be corrected are subjected to linear replacement, for protection of data.

However, the aforementioned DVD-RAM has the problem of a reduced recording capacity caused by the spare areas allocated in a disk fabrication process for protection of data. And, because the size of the spare areas are fixed in advance without regard to the actual defective state of the disk, the spare areas are used inefficiently. In most instances, the disk management technique will not use entire spare areas. Also, if the total number of defective sectors for a block is larger than the total number of spare areas, all of the defective sectors can not be replaced. This causes the disk management technique to fail. In this instance, the system will treat the disk as fatally defective, and the disk will no longer be used.

A CD-RW is one of the rewritable optical recording media. It manages defective sectors only when the defect is fatal, but does not manage correctable errors. The data protection provided by the CD-RW is not adequate.

SUMMARY OF THE INVENTION

Accordingly, the present invention is directed to a method for managing a defective area of an optical recording medium that substantially obviates one or more of the problems due to limitations and disadvantages of the related art.

An object of the present invention is to provide a method for managing a defective area of an optical recording medium, which can make a recording capacity larger while protecting data.

Another object of the present invention is to provide a method for managing a defective area of an optical recording medium, which can store and manage positional information of a defective area encountered during data writing/reading separately from file information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for managing a defective area on an optical recording medium being read by a recording/reproducing device, the recording/reproducing device being controlled by a control unit, the recording/reproducing device reproducing data from the optical recording medium and providing the data to the control unit the method comprising:

(A) returning information on a newly-discovered defective area to the control unit when the defective area is encountered during reading by the recording/reproducing device of data recorded on an optical recording medium;

(B) causing the data intended for the defective area to be written by the recording/reproduction device in another area under the control of the control unit; and (C) causing positional information about the defective area to be written by the recording/reproducing device in the user area under the control of the control unit.

The positional information on the defective area is managed in sector units.

In the other aspect of the present invention, there is provided a method for managing a defective area on an optical recording medium being written to be a recording/reproducing device, the recording/reproducing device being controlled by a control unit, the control unit generating a control signal when data is to be written and providing a first control signal together with the data to be written to the recording/reproducing device for writing the data at a position designated by the first control signal the method comprising:

(A) stopping the writing by the recording/reproducing device if a defective area is encountered during the writing and returning information on the defective area to the control unit;

(B) generating a second control signal when the information on the defective area is received and providing the second control signal to the recording/reproducing device together with the data to be written;

(C) determining if any other defective area is present while writing the data in response to the second control signal from the control unit and returning to step (A) if the defective area is present to repeat steps (A) and (B), and or continuing to write the data if no other defective area is present; and (D) writing the positional information on the one or more defective areas on a particular position of the user area.

The control signal is generated such that no data is written, not only on areas listed on the file information, but also on the defective areas listed on a particular position of the data area.

File information in the ICB concerning a file is interspersed with information about at least one defective area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 5:
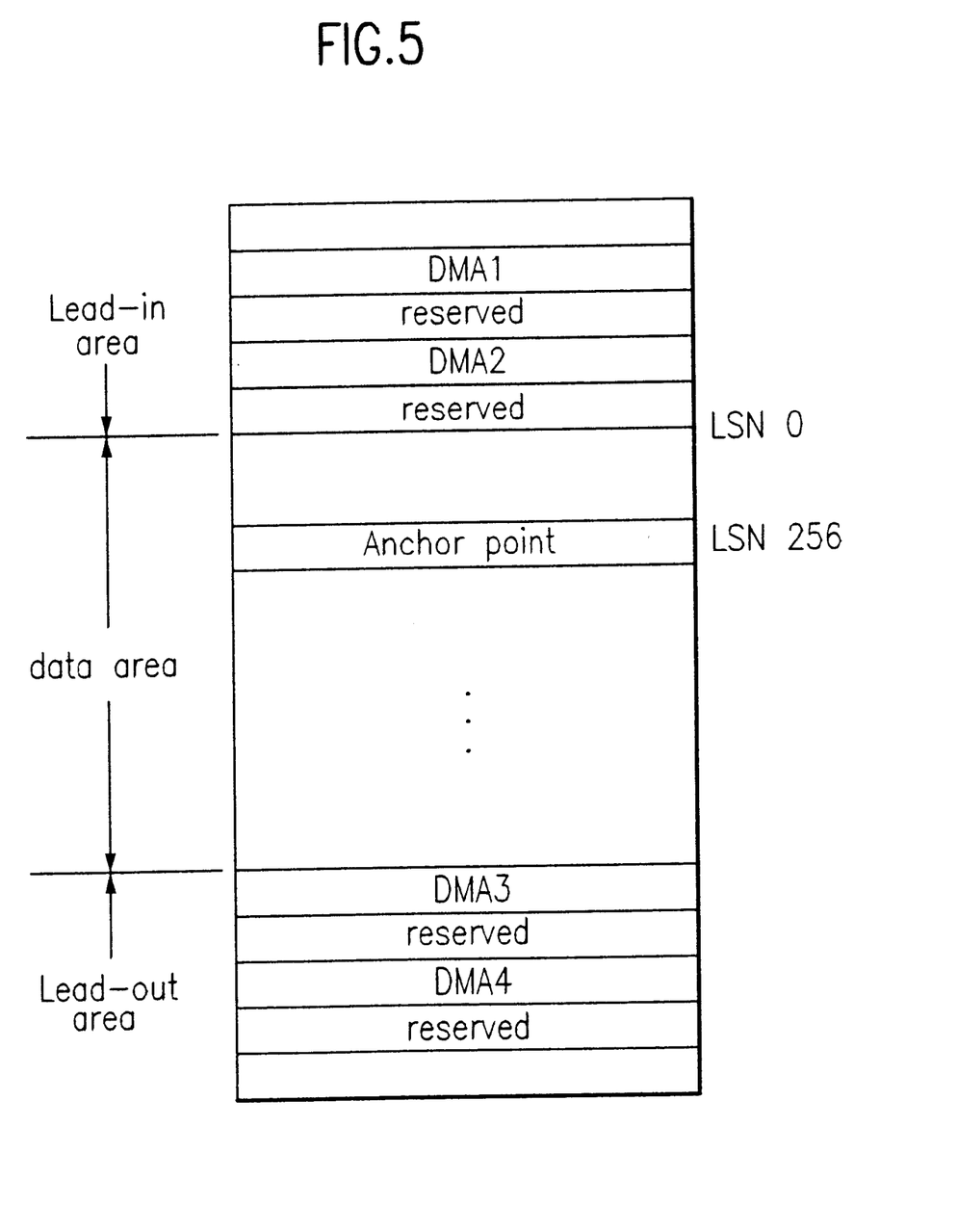
FIG. 5 illustrates a structure of an optical disk in accordance with a preferred embodiment of the present invention.

Reference will now be made in detail to the preferred embodiments of the present invention, examples of which are illustrated in the accompanying drawings. FIG. 5 illustrates a structure of an optical disk in accordance with a preferred embodiment of the present invention, wherein a data area (also known as a user area) has no spare areas, rather only an area for recording actual data. The data area may be managed zone by zone. And, since there is no spare area, no SDL is required in the DMAs in the lead-in area and in the lead-out area. The present invention replaces a defective area within a data area only when a defect is encountered, without providing spare areas. Management of the defective area is accomplished via a file system, thus preventing a reduction of a recording capacity in the manner suffered as a problem of the related art discussed above.

Figure 6:
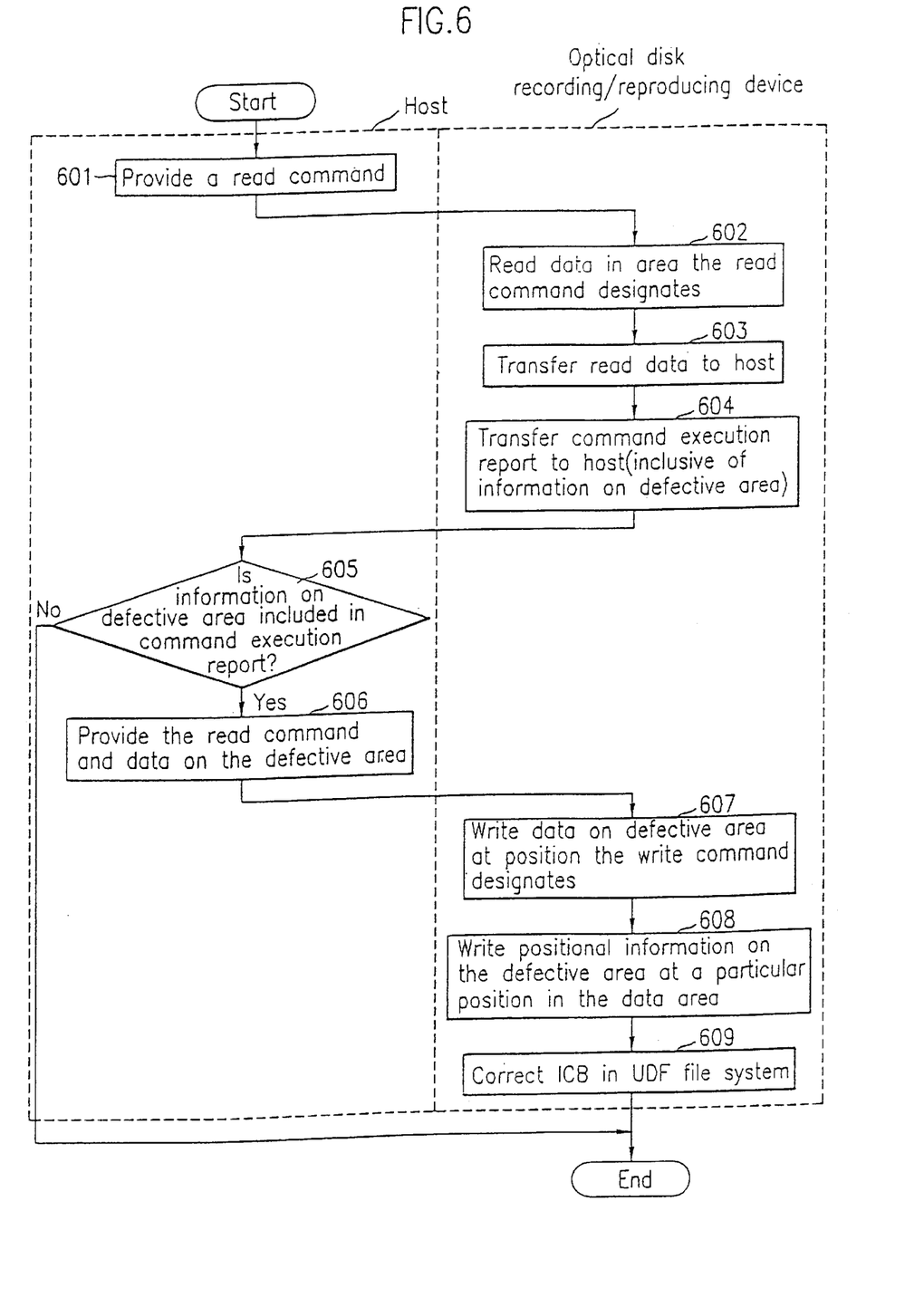
FIG. 6 illustrates a flow chart showing a method for managing a defective area of an optical recording medium during reading in accordance with a preferred embodiment of the present invention.

FIG. 6 illustrates a flow chart showing a method for managing a defective area of an optical recording medium during reading in accordance with a preferred embodiment of the present invention.

Figure 8A:
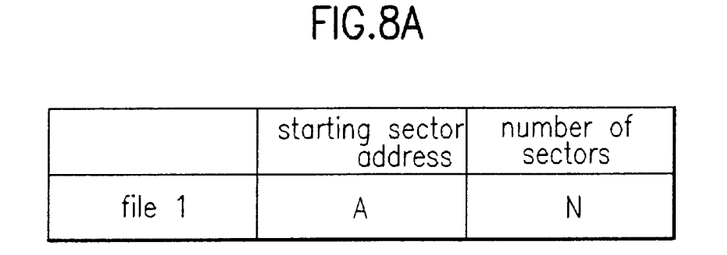
FIG. 8A illustrates a UDF file system on file 1 when no defect has occurred in an optical disk of the present invention.

Referring to FIG. 6, when a user selects reproduction, the host generates a read command with reference to file information in a file system, and provides it to the optical disk recording/reproduction device (step 601). The read command contains an LBA (Logical Block Address) which designates a starting position and a transmission length, thus defining the size of the data. If the file system for file 1, which is desired to be read, is as shown in FIG. 8A, then the host issues a read command to read N sectors of data starting from address A within a user/data area.

Then, the optical disk recording/reproduction device reads data as the host has designated, i.e., N sectors starting from address A (step 602). It provides the read-out data to the host (step 603). And, then, it provides a command execution report to the host (step 604).

If a defective block is encountered within a section that the host designated, i.e., within a section from the sector having address A to the sector having address B, the optical disk recording/reproduction device also includes this information in the command execution report. The above defective block, not listed yet, can include not only a fatally defective block, but also a defective block of which the defect is correctable.

The host determines whether the command execution report includes information on the defective area (step 605). If the command execution report has information only on good states, then this implies that there are no defective blocks among the N sectors. But, if the command execution report includes information about bad states, then this implies that the command execution report has information on defective areas. Therefore, if it is determined in step 605 that the command execution report has information on a defective area, then the host provides data about the defective block together with the write command to the optical disk recording/reproduction device (step 606). The optical disk recording/reproduction device then writes the data about the defective block at a position in the user/data area designated by the write command (step 607).

The position the write command designates is an arbitrary position in the data area (also known as the user area), because there is no spare area employed in the present invention. For example, referring to FIG. 7, if defects are encountered in L sectors starting from address E, then data read from blocks in the L sectors are written to a replacement group of L sectors starting from address C under the control of the host. Since defects encountered during a write/read operation are processed in ECC block units, the value of L is a multiple of 16. Thereafter, positional information on the defective blocks is written to particular positions within the data area (step 608). This prevents the defective blocks from being written to or read from again.

If the file management is conducted as a UDF (Universal Disc Format) file system, then the positional information of the defective blocks is added to a non-allocatable spare list within the data area in the step 608. Because a rewritable optical disk takes all blocks with defects as defective blocks, the positional information on the defective blocks written on the non-allocatable spare list is in block units. That is, the positional information about the to defective blocks is represented by a first sector number of each defective block. The optical disk recording/reproduction device treats the designated sector and the next 15 sectors as defective.

If a defect occurs at a block within the non-allocatable spare list, then the non-allocatable spare list is written according to the foregoing process, with the non-allocatable spare list being written to another block in the data area. In this instance, the positional information of the defective block is also added to the non-allocatable spare list. Thus, a position of the non-allocatable spare list may be changed within the data area, which may be found using an anchor point.

An anchor point is a logical sector number (LSN). Typically, it is duplicated by being written at address 256 and at an end sector of the data area. Any defects that occur at these positions cannot be replaced with other areas. In the UDF file system, all files and directories are managed depending on the anchor point. If there is a defect at the anchor point, the disk is no longer usable.

To protect the anchor point, a few duplicate areas (for example, around 10 sectors) may be assigned within the data area to redundantly write the anchor point. The points of duplication are scattered to many places (for example, zone by zone) as a countermeasure, e.g., against burst error and the like. Because file information is changed, if data for a defective block is written on other block in the data area to replace the defective block, then the file system is also corrected (step 609).

Figure 7:
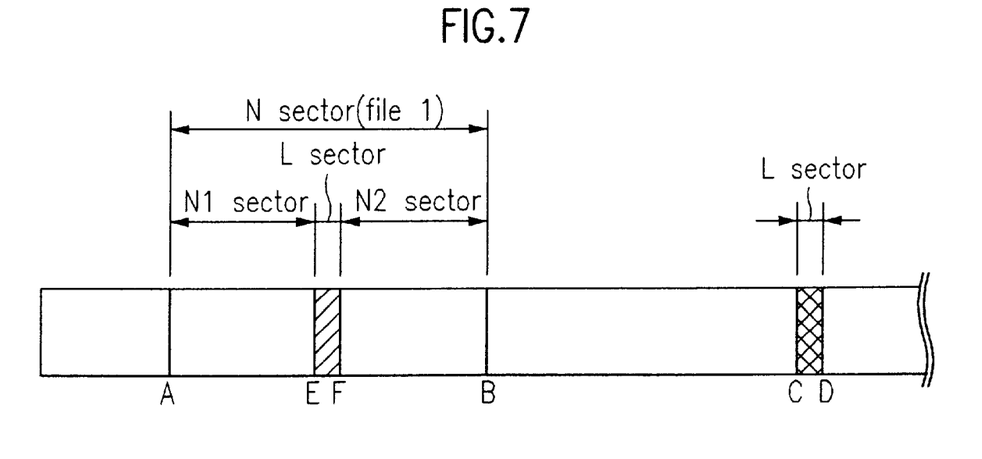
FIG. 7 illustrates data writing with a defective area replaced with other area in an optical disk of the present invention.
Figure 8B:
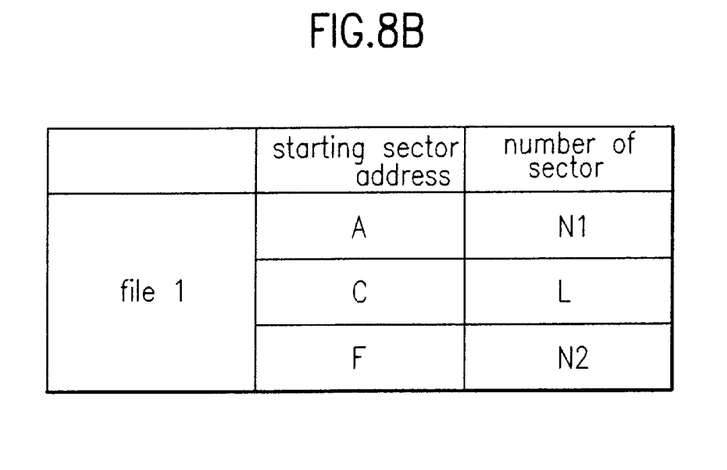
FIG. 8B illustrates a UDF file system on file 1 when a defect has occurred in an optical disk of the present invention; and, FIG. 9 illustrates a flow chart showing a method for managing a defective area of an optical recording medium during recording in accordance with a preferred embodiment of the present invention.

If the file management is conducted according to the UDF file system, and a replacement is made as shown in FIG. 7, an ICB (Information Control Block) showing file starting positions and file sizes is corrected as shown in FIG. 8B. That is, the ICB is initially as shown in FIG. 8A. The file 1 is recorded starting from the sector at address A and continuing for N sectors at the time of issuing the read command. FIG. 8B depicts the ICB representation of how the file is recorded after discovery of the defective area. In FIG. 8, the file 1 is recorded starting from the sector having address A and continuing for N1 sectors, with an interruption in the file starting at the sector having address C for L sectors, and resuming at the sector having address F for N2 sectors, where N=N1+N2. Consequently, three read commands may be required to read file 1 the next time, e.g., read commands for reading N1 sectors starting from address A, reading L sectors starting at address C, and for reading N2 sectors starting at address F. Once data to be written is provided, the host issues the write command with reference to the positional information of the defective blocks listed in the non-allocatable spare list and the ICB.

Figure 9:
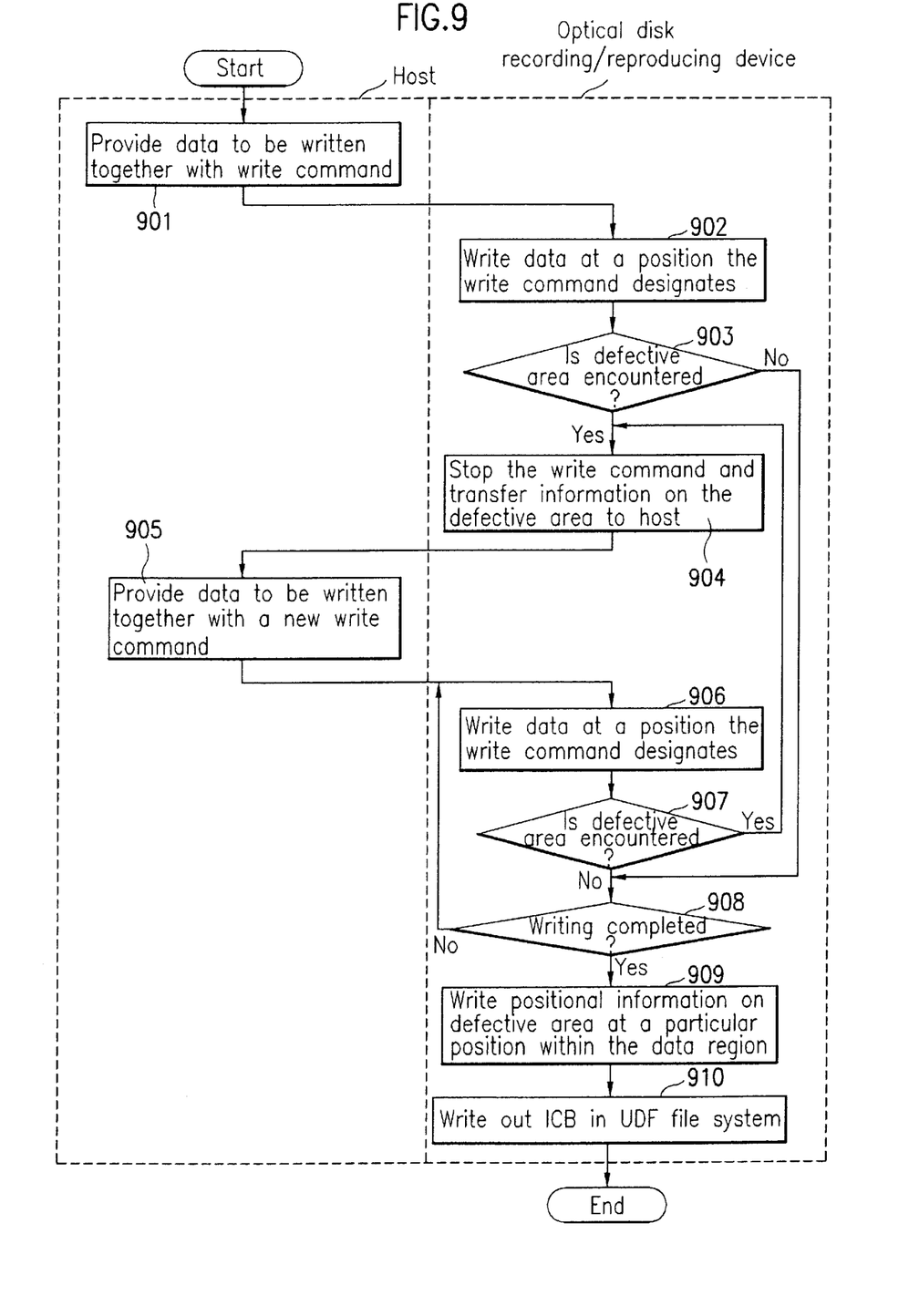

FIG. 9 illustrates a flow chart showing a method for managing a defective area of an optical recording medium during recording in accordance with a preferred embodiment of the present invention.

Referring to FIG. 9, when data to be written is generated, the host provides the data to be written to the optical disk recording/reproducing device, together with a write command (step 901). In this instance, the host issues the write command such that no data is written to areas listed on the ICB, nor to the defective blocks listed on the non-allocatable spare list using the positional information about defective areas listed on the ICB and the non-allocatable spare list. Then, the optical disk recording/reproducing device checks (step 903) if there is a defective area while recording input data starting from a position that the write command designates (step 902).

Because the write command is issued such that no data is written to known defective areas, the defective areas are newly found defective areas, including, not only fatally defective blocks, but also defective blocks of which the defects are correctable. If it is determined that no defective blocks are encountered in step 903, then the data writing operation is continued until it is completed. But if it is determined that a defective block is encountered in step 903, then the write command is interrupted and information about the defective area is returned to the host (step 904). Upon reception of the information about the newly discovered defective area, the host provides a new write command and data to the optical disk recording/reproducing device (step 905). The new write command is generated such that no data is written to the newly-discovered defective area.

For example, if the write command of step 901 is to write N sectors of data starting from address A, and if a defect is encountered at a sector having address E, the write command is stopped and information about the newly-discovered defective block is returned to the host. The host may issue a new write command to write the data starting from a sector having address F. Accordingly, the optical disk recording/reproducing device writes new data from the host starting from the sector having address F as designated by the new write command (step 906).

The optical disk recording/reproducing device keeps on checking for the presence of defective areas while writing data at the position that the new write command designates (step 907). If another new defective area is encountered again, the process proceeds back to step 904, to repeat the foregoing steps. Otherwise, the data writing operation continues, starting at the position the write command designates, until completion (step 908).

If it is determined that the writing is completed in step 908, then the optical disk recording/reproducing device writes positional information about the defective area at a particular position within the data area that is determined by the host. The positional information on the defective area may be written whenever the write command ends, or at a time after the writing is completed.

If the file system is of the UDF, then the positional information about the defective area is added/written to the non-allocatable spare list. Or, if data is written as shown in FIG. 7 according to the write command, then file information is written out on an ICB as shown in FIG. 8B (optional step 910).

Again, FIG. 8B illustrates a case when a write command to write N sectors of data starting from a sector having an address A encounters a defective area of L sectors beginning at address C. Thus, the ICB represents N1 sectors that are separated from N2 sectors by defective block of L sectors. The positional information about the defective area is managed separately from the file information, conferring the advantage that the positional information about the defective area will remain after the file information changes. This prevents the host from attempting to write or read data to/from the defective block.

The positional information about the defective block on the non-allocatable spare list may be newly stored in sector units depending on formatting. If there is a PDL in a DMA, of the defective blocks on the non-allocatable spare list, only sectors having defects are transferred to the PDL, while the positional information on the defective blocks is erased from the non-allocatable spare list. If there is no DMA, only information about the defective sectors should be listed on the non-allocatable spare list while the positional information about the defective blocks may be erased, in the situation where the positional information on the defective blocks and the positional information on the defective sectors are written such that they can be distinguished from each other. To do this, one bit may be used.

As has been explained, the method for managing a defective area of an optical recording medium of the present invention has the following advantages.

First, the reduction in recording capacity due to the provision of spare areas according to the related art can be avoided and efficiency in terms of use of the disk can be improved for a rewritable optical recording medium by replacing a defective block with another block within the data area only when a defect is encountered and making a file system to manage the defective areas. That is, while protecting data with an effect identical to a linear replacement, the recording capacity can be increased.

Second, a life time of the disk can be prolonged because there is no limitation on a size of the available replacement block. This permits data to be written regardless of a number of defective sectors.

Third, since the positional information on the defective area is managed separately from the file information, this permits the positional information about the defective area to remain even after the file information is changed. This prevents a mistake of writing/reading data to/from the defective block.

It will be apparent to those skilled in the art that various modifications and variations can be made in the method for managing a defective area of an optical recording medium of the present invention without departing from the spirit or scope of the invention. Thus, it is intended that the present invention cover the modifications and variations of this invention provided they come within the scope of the appended claims and their equivalents.

What is claimed is:

1. A method for managing a defective area on an optical recording medium being read by a recording/reproducing device, the optical recording medium having a user area thereon, the recording/reproducing device being controlled by a control unit, the recording/reproducing device reproducing data from the optical recording medium and providing the data to the control unit, the method comprising:

(A) returning information on a newly-discovered defective area to the control unit when the defective area is encountered during reading by the recording/reproducing device of data recorded on an optical recording medium;

(B) causing the data intended for the defective area to be written by the recording/reproducing device in any part of the user area that is unused, under the control of the control unit; and (C) causing positional information about the defective area to be written by the recording/reproducing device in the user area under the control of the control unit, wherein the step (B) includes determining randomly one part of the user areas that is unused as an area to which the data intended for the defective area is to be written by the recording/reproducing device.

2. A method for managing a defective area on an optical recording medium being read by a recording/reproducing device, the optical recording medium having a user area thereon, the recording/reproducing device being controlled by a control unit, the recording/reproducing device reproducing data from the optical recording medium and providing the data to the control unit, the method comprising:

(A) returning information on a newly-discovered defective area to the control unit when the defective area is encountered during reading by the recording/reproducing device of data recorded on an optical recording medium;

(B) causing the data intended for the defective area to be written by the recording/reproducing device in any part of the user area that is unused, under the control of the control unit; and (C) causing positional information about the defective area to be written by the recording/reproducing device in the user area under the control of the control unit, wherein, in the step (B), the optical recording medium is without any predesignated spare area so that the entire user area corresponds to an entire data area of the optical recording medium.

3. A method for managing a defective area on an optical recording medium being written to by a recording/reproducing device, the optical recording medium having a user area thereon, the recording/reproducing device being controlled by a control unit, the control unit generating a control signal when a data is to be written and providing a first control signal together with the data to be written to the recording/reproducing device for writing the data at a position designated by the first control signal, the method comprising:

(A) stopping the writing by the recording/reproducing device if a defective area is encountered during the writing and returning information on the defective area to the control unit;

(B) generating a second control signal when the information on the defective area is received and providing the new second control signal to the recording/reproducing device together with the data to be written and writing the data intended for the defective area in any part of the user area that is unused;

(C) determining if any other defective area is present while writing the data in response to the second control signal from the control unit, and returning to step (A) if the defective area is present to repeat the steps (A) and (B), or continuing to write the data if no other defective area is present; and (D) writing the positional information on the one or more defective areas on a particular position of the user area, wherein the step (B) includes determining randomly one part of the user area that is unused as an area to which the data intended for the defective area is to be written by the recording/reproduction device.

4. A method for managing a defective area on an optical recording medium being written to by a recording/reproducing device, the optical recording medium having a user area thereon, the recording/reproducing device being controlled by a control unit, the control unit generating a control signal when a data is to be written and providing a first control signal together with the data to be written to the recording/reproducing device for writing the data at a position designated by the first control signal, the method comprising:

(A) stopping the writing by the recording/reproducing device if a defective area is encountered during the writing and returning information on the defective area to the control unit;

(B) generating a second control signal when the information on the defective area is received and providing the new second control signal to the recording/reproducing device together with the data to be written and writing the data intended for the defective area in any part of the user area that is unused;

(C) determining if any other defective area is present while writing the data in response to the second control signal from the control unit, and returning to step (A) if the defective area is present to repeat the steps (A) and (B), or continuing to write the data if no other defective area is present; and (D) writing the positional information on the one or more defective areas on a particular position of the user area, wherein in the step (B), the optical recording medium is without any predesignated spare area so that the entire user area corresponds to an entire data area of the optical recording medium.

5. A rewritable optical recording medium recording/reproducing system comprising:

a recording/reproducing device to write to or read from an optical recording medium; and a host to control said recording/reproducing device;

said recording/reproducing device being operable to configure said optical medium without inclusion of fixed, predefined spare areas; and said host being operable to control said recording/reproducing device to do at least one of locating a replacement area for a defective portion of a user area of said optical recording medium within any part of said user area that is unused and recording replacement information about defective areas of said optical recording medium in the user area, wherein the host determines randomly one part of the user area that is unused as the replacement area for the defective area.

6. A rewritable optical recording medium recording/reproducing system comprising:

a recording/reproducing device to write to or read from an optical recording medium; and a host to control said recording/reproducing device;

said recording/reproducing device being operable to configure said optical medium without inclusion of fixed, predefined spare areas; and said host being operable to control said recording/reproducing device to do at least one of locating a replacement area for a defective portion of a user area of said optical recording medium within any part of said user area that is unused and recording replacement information about defective areas of said optical recording medium in the user area, wherein the optical recording medium is without any predesignated spare area so that the entire user area corresponds to an entire data area of the optical recording medium.

7. The method in claim 1, wherein the step (C) writes the positional information about the defective area at a particular position of the user area in block units.

8. The method in claim 7, wherein the step (C) writes the positional information about the defective area to a non-allocatable spare list in the user area in block units.

9. The method in claim 1, wherein the positional information about the defective area is managed in sector units.

10. The method in claim 9, wherein the information about defects in sector units is recorded in a lead-in area.

11. The method in claim 9, wherein the information about defects in sector units is recorded in the user area.

12. The method in claim 9, wherein the information about defects in sector units is recorded in a non-allocatable spare list located in the user area, and can be distinguished from information about defects in block units.

13. The method in claim 2, further comprising correcting information in an ICB concerning the positional information about the defective area.

14. The method in claim 13, wherein information in the ICB concerning a file is interspersed with information on at least one defective area.

15. The method in claim 13, wherein, for file information managed according to a UDF file system, a plurality of sectors are allocated for protection of an anchor point.

16. The method in claim 15, wherein the plurality of sectors allocated to the anchor point are assigned to the user area and are dispersed within the user area.

17. The method in claim 3, wherein the control signal is based upon positional information and file information about the defective area.

18. The method as claimed in claim 4, wherein the control signal is generated such that no data is written to known defective areas listed on the file information or defective areas listed on a particular position of the user area.

19. The method as claimed in claim 3, wherein the step (D) includes the step of writing the positional information about the one or more defective areas on a non-allocatable spare list within the user in block units.

20. The method in claim 4, further comprising writing information to an ICB on the optical recording medium concerning positional information about the one or more defective areas.

21. The method in claim 20, wherein information in the ICB concerning a file is interspersed with information about at least one defective area.

22. The method in claim 20, wherein, for file information managed according to a UDF file system, a plurality of sectors are allocated for protection of an anchor point.

* * * * *